United States Patent [19]

Quast

[11] 4,061,831

[45] Dec. 6, 1977

[54] THERMAL RECORDING SYSTEM

[75] Inventor: Kenneth J. Quast, Milford, N.H.

[73] Assignee: Bard Laboratories, Inc., Amherst, N.H.

[21] Appl. No.: 676,425

[22] Filed: Apr. 13, 1976

[51] Int. Cl.[2] ........................ B32B 27/36; B32B 29/00

[52] U.S. Cl. ........................ 428/480; 427/56; 427/384; 427/395; 427/444; 428/537; 428/913

[58] Field of Search ................ 427/150, 151, 56, 395, 427/444, 384; 428/913, 480, 537; 260/567; 282/27.5

[56] References Cited

U.S. PATENT DOCUMENTS

| | | | |
|---|---|---|---|
| 1,880,449 | 10/1932 | Hickman et al. | 96/59 X |
| 2,999,035 | 9/1961 | Sahler | 427/146 X |
| 3,024,362 | 3/1962 | Sus et al. | 427/385 B |
| 3,184,313 | 5/1965 | Rees et al. | 260/567 X |
| 3,293,061 | 12/1966 | Lawton | 260/257 X |
| 3,736,166 | 5/1973 | Lawton | 428/913 X |

OTHER PUBLICATIONS

French Patent Abstracts, vol. 7, No. 36, p. 4:1 (9-1967).
Chem. Abs., Archambault et al., vol. 81, No. 8425k, (1974).

*Primary Examiner*—Harry J. Gwinnell
*Attorney, Agent, or Firm*—Fitch, Even, Tabin & Luedeka

[57] ABSTRACT

Thermorecording sheet, thermorecording method and method of manufacture of a thermally responsive recording paper comprising a reversibly reduced cyclic polyketo compound such as hydrindantin and a thiuram compound having a sulfur chain linkage of at least two sulfur atoms.

20 Claims, No Drawings

THERMAL RECORDING SYSTEM

The present invention is directed to thermally responsive recording systems and more particularly is directed to such thermally responsive recording systems which employ a thermally responsive amine-polyketo color compound reaction system.

Various types of heat sensitive recording sheets are known in which selective thermal activation of a thermally responsive sheet is employed in the recording of information. Thermographic copying processes, such as those using non-focussed infra-red radiation, and in which a thermally responsive copy sheet is placed in intimate contact with a graphic original or master and exposed to infra-red radiation to cause selective heating of the copy sheet with image formation inconformity with the master (such as described in U.S. Pat. No. 2,740,896) represent one type of thermographic recording systems. Other methods of selective thermal activation are also known in thermally responsive recording systems, such as thermal activation through the use of coherent laser radiation, focussed infra-red radiation, and a stream of hot air directed through a capillary tube (e.g., such as described in British Pat. No. 282,759).

Principal conventional applications for thermally responsive reproduction systems include thermal printers for data terminal and computer print-out systems, and chart recording instruments in which a trace is made on a thermally responsive chart paper by a heated stylus. Thermal chart recorders have found considerable use in industrial and medical instrumentation.

The performance and acceptability of thermally responsive chart recording papers for use with heated stylus recording instruments may have deficiencies in a number of areas. Such papers should not be overly pressure sensitive, and the pressure sensitivity which is characteristic of conventional blush coated and cellular coated thermally responsive papers described in U.S. Pat. Nos. 2,299,991, 2,665,262 and 2,739,909 is a disadvantage of such papers. Image permanence and paper stability to handling and storage are additional qualities in a thermal chart paper which are desirable, but difficult to achieve in commercial practice. Furthermore, a suitable thermal chart recording paper intended for use with a heated stylus should not cause stylus fouling or buildup, should not be toxic, and should have wide response latitude with respect to marking speed. The paper should also best be light colored, and preferably white, in its unmarked form, and should produce a dark and preferably dense black mark upon thermal activation.

A wide range of color reaction systems has been proposed or used for thermographic recording sheets, including those involving oxidation of aniline and its analogs, conversion of leuco compounds to the colored form, formation of metal sulfides as through the use of heavy metal salts of dithio carbamic acid or thioacetamide (U.S. Pat. Nos. 1,880,449 and 2,999,035), reduction of metallic salts such as silver to free metal as with indane 1,3 diones (U.S. Pat. No. 3,773,512) and amine-cyclic polyketone reaction systems sensitive to heat (such as described in U.S. Pat. Nos. 3,024,362, 3,293,061 and 3,736,166). Technology utilizing color reaction mechanisms has been developed for thermal recording systems through a number of approaches in efforts to provide for coating stability and other desirable paper properties. For example, thermally responsive color reaction systems may have reactive components which are dispersed in particle form in a suitable binder (e.g., U.S. Pat. Nos. 3,328,191, 3,736,166 and 3,843,384). The cyclic polyketone reaction systems such as the amine-cyclic polyketone reaction systems are generally well known and exemplified by the amine-ninhydrin color reaction. The ninhydrin reaction, which will produce a colored (e.g., blue-violet) reaction product upon reaction with amines, is well known, and may be illustrated by one suggested reaction sequence as follows:

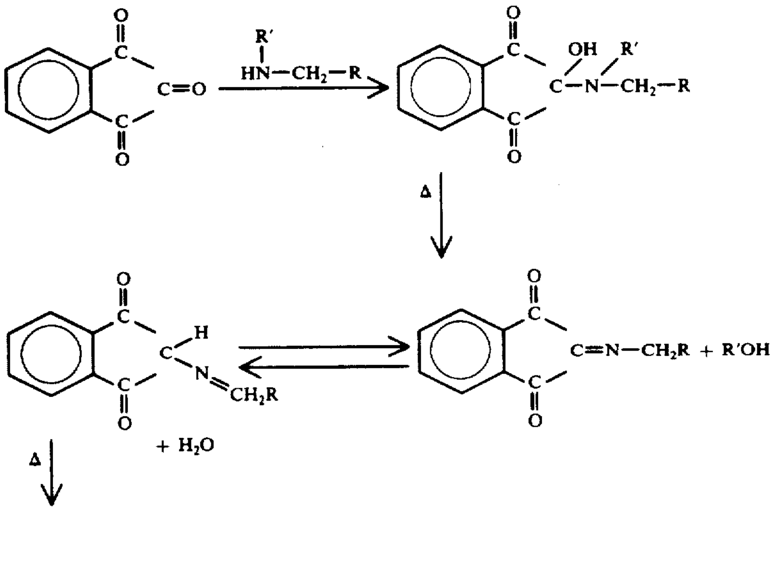

-continued

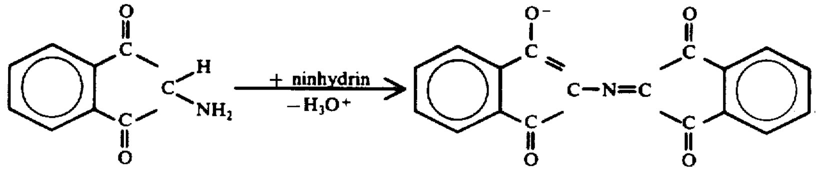

+ RCHO

The reaction of ninhydrin with primary and secondary amines to yield a blue color is a general one and the color produced is, in general theory, independent of the source of the amine nitrogen because the original organic groups are stripped from the nitrogen during color formation. In practice, major color variations may result from the combined effects of competing color-forming reactions and postreactions together with the effects of the relatively great resistance to strip-off of various substituents such as certain aromatics. However, there is a tendency of such color reaction systems to form a distinct color rather than a black mark, and this tendency is a disadvantage for certain applications such as those involving some chart recording papers. A color reaction system which would reliably provide a dense black response to thermal activation would be very desirable.

Accordingly, it is an object of the present invention to provide an improved thermal recording sheet, including an improved chart recording paper. It is a further object to provide a thermal color reaction recording paper which has excellent stability and which does not foul a heated stylus recording tip or other heat source with which it comes in contact. Another object is the provision of an improved color reaction system which may be applied to a paper or other substrate from an aqueous dispersion and which does not unduly color the substrate before marking. It is also an object of the invention to provide a thermally responsive reproduction system which produces a dense black mark, or, optionally, colors.

In accordance with the present invention, a thermally responsive recording sheet is provided which comprises a substrate and a thermally responsive coating on the substrate comprising hydrindantin and an N-substituted thiuram polysulfide. The present invention is also directed to an improvement in methods for recording on a thermally responsive sheet employing selective thermal activation of an aminepolyketo color compound system, the improvement comprising conducting, upon said thermal activation, a redox reaction between a cyclic polyketo compound in reversibly reduced form and an N-substituted thiuram polysulfide, to reductively decompose said thiuram polysulfide and to oxidize said reversibly reduced polyketo compound.

The present invention is particularly adapted for use in connection with thermal chart recording papers, and will be particularly described with respect to such papers. However, the invention in its broader forms has application to other systems, which are intended to be included within the spirit and scope of the present invention.

As indicated, the present invention employs a cyclic polyketo compound in reversibly reduced form which is capable of being oxidized by reaction with an N-substituted thiuram polysulfide. The class of cyclic polyketo amine color reaction compounds is well known, as indicated, in example by U.S. Pat. No. 3,293,061, which has been previously referred to. Hydrindantin is a reversibly reduced dimeric form of the cyclic polyketo compound ninhydrin, which is conventionally produced by reduction of ninhydrin in caustic cyanide solution. The reduction is reversible and ninhydrin may be produced by oxidation of hydrindantin:

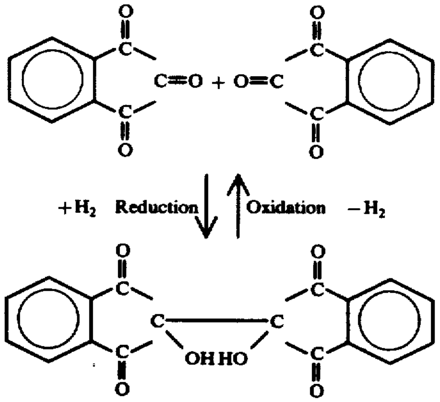

Hydrindantin, like ninhydrin, when anhydrous, is quite red in color. The colorless crystalline hydrated form, and particularly the dihydrate, is therefore preferred.

The second principal component of the color reaction system of the present invention is an N-substituted thiuram polysulfide which has the capability to facilely cleave reductively (with oxidation of the reversibly reduced polyketo compound) and to promptly decompose further to yield an amine. N-substituted thiuram polysulfide compounds include the chemical structure:

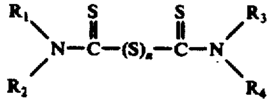

where $n$ is 2 or more and where $R_1$, $R_2$, $R_3$ and $R_4$ are hydrocarbon radicals, each preferably having from 1 to 10 carbon atoms. $R_1$ and $R_2$, and $R_3$ and $R_4$ may be joined covalently, for example through methylene ($-CH_2-$), oxygen ($-O-$) or sulfide ($-S-$) linkages. In particularly preferred embodiments which provide enhanced production of a black mark, the color system will include a thiuram compound in which $n$ is greater than 2, and preferably from 4 to 6, as will be discussed hereinafter. The nitrogen compounds forming the basis of the N-substituted thiuram polysulfide compounds should be capable of entering into a color reaction with the oxidized form of the cyclic polyketo compound used in the system, and preferred nitrogen compounds are secondary amines. Thiuram polysulfide derivatives of cyclic secondary amines such as piperidine are particularly preferred. The N-substituted thiuram disulfides based on secondary amines are conventionally made by reacting the secondary amine to form a thiocarbamide and oxidizing the thiocarbamide to form the thiuram compound:

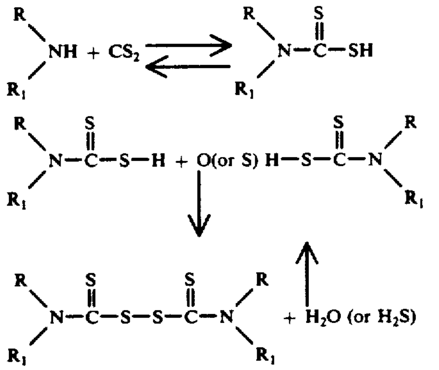

The higher thiuram polysulfides than the disulfide may be regarded as being in a higher oxidation state, and generally the sulfur chain length will be 6 sulfur atoms or less.

Primary amines, when subjected to the usual thiuram disulfide manufacturing process, tend to produce a variety of compounds rather than a single well-defined product. This mixture of compounds produced may be successfully employed in the present invention, and in any event, other synthesis may become commercially practicable.

As previously mentioned, it is particularly desirable in providing reaction systems of the present invention which produce a dense black mark, that the thiuram polysulfide component include a thiuram polysulfide compound having a sulfur chain greater than two sulfur atoms in length. An example of a particularly preferred higher thiuram polysulfide which is based on a cyclic secondary amine is dipentamethylene thiuram hexasulfide:

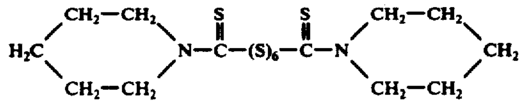

When the N-substituted thiuram polysulfides linked by more than two sulfur atoms decompose to yield amine, they also liberate reactive sulfur. The reactive sulfur apparently is capable of reacting with the initially blue ninhydrin dye to convert it to a black form. The chemistry is not fully understood, but perhaps is similar to the reactions involved in the commercial manufacture of sulfur dyes which include compounds having colors ranging from dark brown to various shades of black. Reference may be made to Venkataraman, K., The Chemistry of Synthetic Dyes, Academic Press, N.Y., Vol. II, Ch. XXXV and XXXVI, pp. 1059–1117 (1952).

A number of non-thiuram polysulfide rubber accelerator compounds have been tested and found to be unsuitable. In this connection, thiuram monosulfides and dithiocarbamate salts, which in part resemble the thiuram polysulfides in chemical structure, have proved unacceptable in recording paper formulations.

Having described the principal components of the color reaction system, it will now be appreciated that although dependent on a color forming reaction between an amine and a cyclic polyketo compound, the principal coreactants provided on the substrate in accordance with the present invention are so chosen as to be not directly reactive to form a colored reaction product. Hydrindantin is a reversibly reduced dimer of the cyclic polyketo compound ninhydrin which has been stabilized in the dimer form by chemical reduction. Similarly, the N-substituted thiuram polysulfide component is made from a material which readily decomposes to yield an amine, and which has been stabilized against breakdown into the monomer form by oxidation. Thus, a prerequisite to facile color formation is that the preoxidized thiuram polysulfide component be reduced and that the prereduced hydrindantin be oxidized. These components are capable of participating in a redox reaction with each other to accomplish this respective reduction and oxidation when thermally activated, but only after intimate admixture.

In the manufacture of thermally responsive chart recording papers, the reduced polyketo component and the thiuram polysulfide component, in a suitable binder solution, may be coated on the desired substrate, usually paper. A variety of different binder materials may be used, and the particular binder used may be selected based upon the end use of the coated product.

The reduced polyketo compound and the thiuram polysulfide component are generally insoluble in water. These components are soluble in various organic solvents and may be coated on the substrate from organic solvent solution or emulsion, either separately or from the same solution, and preferably with a suitable binder material. However, for thermal chart paper application, the coating system is advantageously an aqueous system in which the binder is water-soluble or dispersable, and in which the reduced polyketo component and the thiuram component are present in finely divided particulate form. Binders which have been found to work quite well include polyvinyl acetate which has been 65 to 100% prehydrolized to polyvinyl alcohol, and preferably also premodified by reaction with ethylene oxide to add pendant ether-linked hydroxyethyl groups for internal plasticization, methyl cellulose, and methyl celluloses modified to also contain other ether-linked lower alkyl groups. Other water-based binders successfully employed include modified starches and latices containing styrene-butadiene polymers, acrylic polymers, and/or vinyl acetate polymers. Water-soluble polymers of vinyl methyl ether may be too tacky for use alone, but, as a binder component, such polymers may tend to soften other water-soluble binder materials and may be beneficially used for this purpose. Even suitably prepared gelatin solutions (for example, containing about 5 parts by weight morpholine per 100 parts gelatin to moderate a tendency of this material to set to a gel) may be used in a binder system.

The principal co-reactants must be intimately mixed to provide color compound formation upon thermal activation, and in this regard, the binder material chosen for thermal chart recording papers for use with heated stylus recording instruments in which the stylus contacts the paper, will generally be selected so as to soften and not inhibit the development of colored compound formation at locations contacted by the stylus. The binder material should also best be selected to substantially prevent flooding of the thermally induced mark in those adjacent mechanically undisturbed areas which are radiantly or conductively heated by an overly hot stylus.

The weight of the binder to be used will usually fall within the range of 10 to 100 parts by weight per 100 parts of other ingredients of the coating, on a dry basis. For paper coating application, generally from about 0.3 to about 2.0 pounds, and preferably from about 0.5 to about 1.0 pounds of hydrindantin will be used per ream (one side, 3000 sq. ft.) of substrate, and generally from about 0.3 to about 3.0, and preferably from about 0.5 to about 2.0, moles of the thiuram component per mole of the cyclic polyketo component will also be used.

Various other materials may be included in the color system formulation for various purposes if desired. For example, fluxing aids to facilitate the intimate admixture of the principal coreactants upon thermal activation, such as diphenyl guanidine and dihydroxydiphenyl sulfone may be incorporated in the coating composition. Inorganic materials such as titanium dioxide and calcium carbonate may be used to enhance paper whiteness, although it will be recognized that such inorganic materials are generally undesirable for applications such as heated stylus chart recording paper. Other materials, such as organic whiteners and brighteners may be similarly employed to achieve a particular purpose, provided they do not have an excessively injurious effect on system stability or performance.

In the manufacture of the coated substrate, the principal reactants of the color reaction system, the binder, and any optional ingredients, are coated on a suitable substrate. For thermal chart recording papers, coating the materials from an aqueous dispersion is particularly desirable. In such aqueous systems, the reversibly reduced cyclic polyketo component and the N-substituted thiuram polysulfide component are provided in the dispersion in finely divided form so that the principal thermally co-reactive ingredients, which are generally insoluble in water, will be present in the dried, active coating as dispersed, finely divided solid particles. Preferably the particle size of each of these components should be less than 2 microns and should best be below 0.5 microns. Should dispersions in the aqueous binder may be provided in an appropriate manner such as by grinding the materials in an aqueous solution of the binder material. For example, the components may be ground in a ball mill until a desired level of particle size is achieved. Other methods may be used where appropriate, such as processing by means of a three roll mill or an attritor.

The following examples illustrate various aspects of the present invention.

In the following Examples 1-22, amounts are indicated in parts by weight. For aqueous systems, the binders used are made into stock solutions containing 5 parts by weight binder and 95 parts by weight water. The remaining ingredients, if water insoluble, are individually dispersed by ball milling 15 parts by weight of the water insoluble ingredient in 60 parts by weight of the stock binder solution until suitably fine, and coating formulations are made by blending these ball milled grinds. The formulations are coated on a 30 lb/3000 sq. ft. ream base paper using a wire-wound metering rod. After warm air drying, coating weights are approximately 2.0 lbs/3000 sq. ft. ream. Two and one half inch wide strips of the dried, coated paper are then tested on a Sanborn 500 Visio-Cardiette electrocardiograph (Sanborn Division, Hewlett-Packard Co., Inc.) using a simulated heart signal, with the manufacturer's recommended stylus, stylus pressure, heat and speed settings being used in the testing.

EXAMPLE 1

The following coating formulation is prepared by blending appropriate weights of individual ball mill grinds. The resulting formulation is then coated on the paper substrate, dried and tested as described above:

| | |
|---|---|
| Hydrindantin, dihydrate | 10 |
| Di(pentamethylene) thiuram hexasulfide | 5 |
| Methyl, hydroxypropyl cellulose ether | 3 |
| Water | 57 |

The mixed ether cellulose binder component (Methocel E15, Dow Chemical Co., Midland, Michigan) is stated by the manufacturer to contain 29% methoxyl and 8.5% hydroxypropyl groups by weight. The mark produced on the coated paper by the thermal chart recording equipment is a dense black color. Additional runs yielding excellent marks may be conducted in which the reactive ingredient proportions are varied from 3:1 to 1:3, but the proportions set forth above are preferred.

EXAMPLES 2 and 3

Formulations duplicating those of Example 1 are prepared, except that different di(pentamethylene thiuram) disulfide component samples are employed which differ as to the oxidant chosen to effect the dimerization step in their manufacture, in order to illustrate the effect on image color of by-product higher polysulfides present in normal commercial disulfides dimerized by sulfur oxidation:

| Example | 2 | 3 |
|---|---|---|
| Hydrindantin, dihydrate | 10 | 10 |
| Di(pentamethylene) thiuram disulfide | 5 | 5 |
| Oxidant used for disulfide formation | $H_2O_2$ | Sulfur |
| Methyl, hydroxypropyl cellulsoe ether | 3 | 3 |
| Water | 57 | 57 |

The thermally generated images on the paper substrate coated with the formulation of Example 2 are dense blue, while those from paper coated with the formulation of Example 3 are black.

EXAMPLES 4-11

Coating formulations employing a variety of different N-substituted thiuram polysulfides are prepared and tested as described in Example 1, and using the same relative weight proportions of the hydrindantin, methyl, hydroxypropyl cellulose ether, water and the indicated thiuram sulfide compound component as set forth in Example 1. The color of the thermally induced marks on paper substrates coated with the respective formulations is indicated for each of the examples.

| Example No. | N-Substituted Thiuram Polysulfide | Mark |
|---|---|---|
| 4 | Tetramethyl thiuram disulfide | Blue-black |
| 5 | Tetramethyl thiuram polysulfide ($n>2$) | Black |
| 6 | Tetraethyl thiuram disulfide | Blue-black |
| 7 | Tetraisobutyl thiuram disulfide | Brownish black |
| 8 | Tetrabenzyl thiuram disulfide | Red |
| 9 | N,N'diethyl thiuram disulfide | Blue |
| 10 | N,N'diisobutyl thiuram disulfide | Blue |
| 11 | Bis(diethylene oxide)thiuram | Red |

-continued

| Example No. | N-Substituted Thiuram Polysulfide | Mark |
|---|---|---|
| | disulfide | |

The thiuram component of Example 5 is prepared by treating Example 4 material with active sulfur. The red color of Examples 8 and 11 shows the effect of amine substituents which are difficultly strippable, thereby preventing completion of the ninhydrin blue reaction. These markings become blue on storage. The thiuram components of Examples 9 and 10 are made by using hydrogen peroxide to effect dimerization.

EXAMPLES 12-17

The following Examples 12-17 illustrate the use of various fluxing aids which are dispersed by ball mill grinding 15 parts of the fluxing aid in 60 parts of the stock binder solution used in Example 1. Individual test coating mixes are then prepared by addition to a sample of coating formulation prepared according to Example 1 in the proportions shown below, coated on paper, and tested as indicated in Example 1.

| Example No. | Material Ground Into Stock Binder | Parts of fluxing aid dispersion per 75 parts of the coating formulation of Example 1 |
|---|---|---|
| 12 | Diphenyl phthalate | 37.5 |
| 13 | Toluene sulfonamide (orthopara mixture) | 37.5 |
| 14 | Triphenyl phosphate | 37.5 |
| 15 | Dimethyl sulfone (water soluble) | 37.5 |
| 16 | Mercapto benzothiazole | 5 |
| 17 | Symmetrical diphenyl guanidine | 5 |

On melting concommitant with thermal activation, solvent action provided by the fluxing aid facilitates molecular mixing of the reactants. Examples 13 and 15 permit higher marking speed. Examples 16 and 17, when used as a minor additive, permit increased marking speeds. If desired, diphenyl guanidine may be added as the salt of a weak acid such as mercapto benzothiazole. Other additives which may be employed to modify performance for various purposes include internal lubricants such as soaps, fatty acids, fatty amides, waxes, resins, and ethylene oxide polymers.

As previously indicated, utility of the above examples is not confined to the single binder illustrated, and other binders may possess acceptable or superior characteristics for certain uses. Among those tested and found to provide highly satisfactory performance are the polyvinyl acetates which have been 65 to 100% hydrolized to the free alcohol and, preferably, plasticized internally by ethylene oxide treatment. Various commercial alkyl and alkhydroxy mixed ethers of cellulose have also been found to be satisfactory. Other useful binders include modified starches, methyl cellulose, carboxymethyl ethyl cellulose, carboxy methyl hydroxyethyl cellulose, poly vinyl acetate emulsions, acrylic polymer emulsions, and gelatin when gelation is retarded by partial neutralization.

The invention applies similarly to non-aqueous coating formulations, Examples 18, 19, 20 show non-aqueous usage with, respectively, (a) the reactants maintained as a dispersion, (b) one reactant in solution and one dispersed, and (c) all ingredients in solution.

EXAMPLE 18

A binder solution is prepared using ethyl hydroxyethyl cellulose ether (EHEC Low, Hercules, Inc., Wilmington, Delaware) 6 parts, heptane 96 parts, and toluene 24 parts. Stock ball mill grinds of each ingredient are then separately prepared, as before, using 15 parts of solid to 60 parts stock binder solution, blended to the ingredient ratio listed below, then coated on the paper substrate and tested.

| | |
|---|---|
| Hydrindantin, dihydrate | 10 |
| Dipentamethylene Thiuram hexasulfide | 5 |
| Ethyl, hydroxyethyl cellulose mixed ether | 3 |
| Heptane | 45.6 |
| Toluene | 11.4 |

The trace marked by the stylus is similar to that obtained for Example 1.

EXAMPLE 19

A solvent mix is prepared using the same binder as Example 18, but with toluene as the sole solvent to permit complete solution of the thiuram derivative. The hydrindantin, being insoluble, however, is ground as in the previous example. The coating formulation has the following ingredient proportions:

| | |
|---|---|
| Hydrindantin, dihydrate | 10 |
| Dipentamethylene thiuram disulfide | 5 |
| Ethyl, hydroxyethyl cellulose mixed ether | 3 |
| Toluene | 60 |

When tested, the trace is similar to that of the aqueous dispersion formulation of Example 3, which has a similar composition.

EXAMPLE 20

A solvent mixture is prepared by mixing 10 parts pyridine, 30 parts toluene, 30 parts methanol, and 30 parts methyl ethyl ketone. The following ingredients are then dissolved in this solvent, in the order and relative quantity listed, to provide a clear solution.

| | Parts |
|---|---|
| Hydrindantin, dihydrate | 2 |
| Di(pentamethylene) thiuram disulfide | 2 |
| Nitrocellulose, 5 sec. visc., 12.02N, ethanol wet (5 parts dry nitrocellulose, 2 parts ethanol) | 7 |
| Mercapto benzothiazole | 1 |

This clear solution is coated on a 3 mil thick biaxially-oriented clear polyester film (Mylar, product of duPont), and dried. When imaged on a Thermofax, Secretary Model thermal copier (manufactured by 3M), a blue, high contrast, transparent image on a colorless transparent background, useful as a transparency for overhead projection, is obtained.

As is the case with aqueous systems, various different binder materials may be used in non-aqueous formulation.

EXAMPLES 21 and 22

The following examples illustrate the use of reversibly reduced cyclic polyketo compounds other than hydrindantin.

Reversibly reduced isatin (available in prereduced form from Allied Chemical, New York) and reversibly reduced alloxan are employed in the preparation of two separate coating formulations. The reversibly reduced alloxan is prepared by reducing alloxan at 25° C by slow addition, with agitation, of saturated aqueous sodium hydrosulfite to an aqueous alloxan solution, stopping just short of complete loss of pink coloration. The insoluble reduced alloxan is vacuum-filter recovered, water and acetone rinsed, and dried. Ingredients set forth in each respective example are individually dispersed in an aqueous binder solution using proportions and procedures as employed in Example 1. Weighed portions of these dispersions were blended to mixes having contained ingredients in the proportions tabulated, coated on paper at 4 dry lbs/3000 sq. ft. and tested as described in connection with Example 1, with the indicated coating color and test results:

| Example No. | 21 | 22 |
|---|---|---|
| Reduced Isatin | 5 | 0 |
| Reduced Aloxan | 0 | 5 |
| Di(penthamethylene) thiuram hexasulfide | 5 | 5 |
| Toluene sulfonamide (mixed ortho and para isomers) | 2.5 | 2.5 |
| Mercapto benzothiazole | 2.5 | 2.5 |
| Cellulose mixed lower alkyl ether (Klucel L, Hercules, Wilmington, Del.) | 3 | 3 |
| Water | 57 | 57 |
| Color of dried coating | Pale tan | White |
| Color of thermal mark | Green | Red |

Omitting either the thiuram or the reduced polyketo component prevents mark development.

While the present invention has been described with particularity for an aqueous dispersion coated chart recording paper for use with a heated stylus recording instrument, it will be apparent that various modifications and adaptations may be made which are within the spirit and scope of the invention. For example, while an unsubstituted cyclic polyketo component has been specifically described, substituted cyclic polyketo compounds and mixtures of such compounds with each other and/or an unsubstituted polyketo compound, to the extent such substitution does not have a deleterious effect on the system, are contemplated and may provide for color variation or a more chemically efficient attainment of a dense black mark or desired color mark, particularly where a higher thiuram polysulfide is not used. Moreover, while the invention has been described particularly with respect to dimeric thiuram compounds, compounds having oligomeric or polymeric N-substituted thiuram functionality

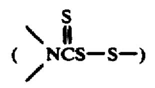

might be employed. Substrates other than paper (such as organopolymeric sheets) may also be used, and other applications for paper-substrate systems, such as for thermal computer printout purposes, are also contemplated.

Other modifications and adaptations within the spirit and scope of the present invention will be apparent from the present disclosure.

Various of the features of the invention are set forth in the following claims.

What is claimed is:

1. A thermally responsive recording sheet comprising a substrate and a thermally responsive coating on the substrate comprising in a reversibly reduced form, a cyclic polyketo compound, color reactive with amines, and an N-substituted thiuram polysulfide.

2. A recording sheet in accordance with claim 1 wherein said reversibly reduced cyclic polyketo compound is hydrindantin.

3. A recording sheet in accordance with claim 1 comprising an N-substituted thiuram polysulfide of the structure:

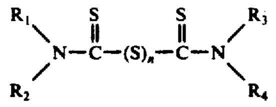

where $n$ is 2 or more and where $R_1$, $R_2$, $R_3$ and $R_4$ are hydrocarbon radicals.

4. A recording sheet in accordance with claim 3 wherein $R_1$, $R_2$, $R_3$, and $R_4$ have from 1 to 10 carbon atoms.

5. A recording sheet in accordance with claim 4 wherein $R_1$ and $R_2$, and $R_3$ and $R_4$ are covalently joined.

6. A recording sheet in accordance with claim 1 wherein said N-substituted thiuram polysulfide comprises a thiuram polysulfide having a sulfide chain length of more than 2 sulfur atoms.

7. A recording sheet in accordance with claim 1 wherein said substrate is a clear polyester film.

8. A recording sheet in accordance with claim 1 wherein said reduced polyketo compound comprises a compound selected from the group consisting of reversibly reduced alloxan and reversibly reduced isatin.

9. A recording sheet in accordance with claim 2 wherein said substrate is paper, wherein said coating includes an organopolymeric binder and wherein said hydrindantin and said N-substituted thiuram polysulfide are each present in finely divided form.

10. A recording sheet in accordance with claim 9 wherein said N-substituted thiuram polysulfide comprises an N-substituted thiuram polysulfide having a sulfur chain of more than two sulfur atoms.

11. A recording sheet in accordance with claim 10 wherein said hydrindantin is in hydrated form.

12. A recording sheet in accordance with claim 9 wherein said hydrindantin is in hydrated form.

13. A recording sheet in accordance with claim 9 wherein said organopolymeric binder is a water soluble polymer.

14. A recording sheet in accordance with claim 13 wherein said water soluble polymer is selected from the group consisting of polyvinyl alcohol, methyl cellulose, alkyl and alkhydroxy mixed ethers of cellulose, carboxymethyl ethyl cellulose, and carboxymethyl hydroxyethyl cellulose.

15. A recording sheet in accordance with claim 13 wherein one of said reactive hydrindantin and thiuram polysulfide components is deposited on said substrate from solution and the other of said components is deposited on said substrate from dispersion.

16. A recording sheet in accordance with claim 13 wherein both of said reactive hydrindantin and thiuram polysulfide components are deposited on said substrate from solution.

17. In a method for recording on a thermally responsive sheet employing selective thermal activation of an amine-polyketo color compound system to produce a visible mark, the improvement comprising conducting, upon said thermal activation, a redox reaction between a cyclic polyketo compound in reversibly reduced form and an N-substituted thiuram polysulfide to reductively decompose said thiuram polysulfide and to oxidize said reduced polyketo compound to provide, respectively, cyclic polyketo compound and reactive amine components of an amine-cyclic polyketo color compound system responsive to said thermal activation.

18. A method in accordance with claim 17 wherein said N-substituted thiuram polysulfide comprises an N-substituted thiuram polysulfide having a sulfur chain of more than two sulfur atoms.

19. A method in accordance with claim 18 wherein said reversibly reduced polyketo compound comprises hydrated hydrindantin.

20. A method of manufacturing a thermally responsive recording paper, comprising, providing an aqueous coating dispersion of finely divided hydrindantin and finely divided N-substituted thiuram polysulfide in an aqueous solution or dispersion of a suitable water soluble or dispersable binder material, coating a base paper substrate with said aqueous coating dispersion, and drying said coated paper.

* * * * *